United States Patent
Sakata et al.

(10) Patent No.: US 7,192,147 B2
(45) Date of Patent: Mar. 20, 2007

(54) LIGHTING SYSTEM AND PROJECTOR

(75) Inventors: Hidefumi Sakata, Tatsuno-cho (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 120 days.

(21) Appl. No.: 10/434,288

(22) Filed: May 9, 2003

(65) Prior Publication Data

US 2003/0231497 A1 Dec. 18, 2003

(30) Foreign Application Priority Data

May 10, 2002 (JP) .............................. 2002-135641

(51) Int. Cl.
*F21V 9/14* (2006.01)
(52) U.S. Cl. ..................... 362/19; 362/293; 362/311; 359/487; 359/486; 359/251; 353/2
(58) Field of Classification Search ................ 362/19, 362/293, 298, 26, 311; 359/487, 485, 486; 359/251, 250, 629; 353/20
See application file for complete search history.

(56) References Cited

U.S. PATENT DOCUMENTS

| | | | | |
|---|---|---|---|---|
| 6,028,703 | A * | 2/2000 | Sekine et al. ................. | 359/487 |
| 6,033,091 | A * | 3/2000 | Daijogo et al. .............. | 362/294 |
| 6,064,523 | A | 5/2000 | Budd et al. | |
| 6,108,131 | A | 8/2000 | Hansen et al. | |
| 6,243,149 | B1 * | 6/2001 | Swanson et al. ............... | 349/62 |
| 6,445,500 | B1 * | 9/2002 | Itoh ............................ | 359/487 |
| 6,508,571 | B2 * | 1/2003 | Chuang ........................ | 362/237 |
| 6,533,427 | B2 * | 3/2003 | Chang .......................... | 362/19 |
| 6,547,400 | B1 | 4/2003 | Yokoyama | |
| 6,547,421 | B2 | 4/2003 | Sugano | |
| 6,587,269 | B2 * | 7/2003 | Li ............................... | 359/497 |
| 6,830,339 | B2 * | 12/2004 | Maximus ..................... | 353/20 |
| 6,866,404 | B2 * | 3/2005 | Yamauchi et al. .......... | 362/299 |
| 2002/0141192 | A1 * | 10/2002 | Tiao et al. ................... | 362/299 |
| 2002/0176255 | A1 * | 11/2002 | Yamauchi et al. .......... | 362/299 |
| 2003/0133299 | A1 * | 7/2003 | Chuang ....................... | 362/296 |
| 2003/0161136 | A1 * | 8/2003 | O'Connor et al. ............ | 362/19 |

FOREIGN PATENT DOCUMENTS

| | | |
|---|---|---|
| EP | 0 837 351 A2 | 4/1998 |
| EP | 0 985 952 A1 | 2/1999 |
| EP | 1 003 064 A1 | 5/2000 |
| EP | 1 200 874 A0 | 5/2002 |
| JP | A-05-181135 | 7/1993 |
| JP | A-10-269802 | 10/1998 |
| JP | A-11-006989 | 1/1999 |
| JP | A-2000-112031 | 4/2000 |
| JP | A-2001-074935 | 3/2001 |
| JP | A-2001-343706 | 12/2001 |
| WO | WO-99/49358 | 9/1999 |
| WO | WO-99/59005 | 11/1999 |

\* cited by examiner

*Primary Examiner*—Sandra O'Shea
*Assistant Examiner*—Jacob Y. Choi
(74) *Attorney, Agent, or Firm*—Oliff & Berridge, PLC

(57) ABSTRACT

The invention provides a compact, thin, and lightweight lighting system and projector. A lighting system included in a projector according to the present invention is provided with an LED array having LEDs and a reflective plate at the rear side of the LEDs in the light emitting direction, retardation films, a taper rod lens array, a rod lens array, and a reflective polarizing plate.

4 Claims, 4 Drawing Sheets

LIGHTING SYSTEM AND PROJECTOR

BACKGROUND OF THE INVENTION

1. Field of Invention

The present invention relates to a lighting system and a projector. Particularly, the invention relates to a structure of a lighting system having a high efficiency for light utilization.

2. Description of Related Art

A related art projector combines imaging light with a light modulation unit, such as a liquid crystal light valve, and projects the combined and enlarged light image on a screen from a projection optical system including a projection lens. In a lighting optical system used in such a projector, light emerging from a light source, such as a metal halide lamp, is randomly polarized light. However, a liquid crystal projector including a liquid crystal light valve using polarized light utilizes only polarized light in one direction for display. When light from the light source is incident on the liquid crystal light valve, merely a half quantity of light is absorbed in a polarizing plate at the light incident side, the absorbed light being not utilized for display.

In order to enhance the efficiency for light utilization, a related art liquid crystal projector is provided with a polarization conversion device provided between the light source and the liquid crystal light valve to convert randomly polarized light from the light source to unidirectionally polarized light that is used for display. A polarization conversion device that is generally used is a polarized beam splitter (PBS) array. The PBS array is a combination of a plurality of PBSs, each having a polarization beam separation film and a reflective film, and a retardation film such as a ½ wavelength film. The PBS array has a function that one of the p-polarized light component and the s-polarized light component contained in the light from the light source is converted to the other.

SUMMARY OF THE INVENTION

Unfortunately, the polarization conversion device having the PBS array of the related art projector is subject to the following problems.

Since each PBS element has a measure of area, the PBS array including PBS elements inevitably has a considerable size and does not meet recent requirements of reduction in the size, thickness, and weight of the projector or does not sufficiently meet these requirements. Furthermore, the light must be incident on the polarization beam separation films of the PBS array. Thus, a lens system is required to converge the light to the polarization beam separation films. Accordingly, the structure of the polarization conversion device is complicated. In addition, the p-polarized light and the s-polarized light separated by the polarization beam separation film have different optical path lengths, resulting in shifting of the lighting condition on the light valve and thus a decrease in efficiency for light utilization.

In order to address or solve the above and/or other problems, the present invention provides a compact, thin, and lightweight lighting system having a high efficiency for light utilization and a simple structure. The invention also provides a compact, thin, and lightweight liquid crystal projector provided with the lighting system.

To address or achieve the above, a lighting system according to the present invention includes at least one light source, a polarization conversion device that polarizes light from the light source in one direction, and at least one reflection plate that is disposed at the rear side of the light source in the light emitting direction such that the reflective face of the reflection plate is opposite to the light source. The polarization conversion device is provided at the light emitting side of the light source, the polarization conversion device having a reflective polarizing plate that transmits polarized light having a predetermined vibration direction and reflects polarized light having vibration directions other than the predetermined vibration direction.

According to this structure, the reflective polarizing plate that transmits one type of polarized light (for example, p-polarized light) and reflects the other type of polarized light (for example, s-polarized light) is provided at the light emitting side of the light source. When randomly polarized light from the light source is incident on the reflective polarizing plate, for example, the p-polarized light passes through the reflective polarizing plate while the s-polarized light is reflected toward the light source. The reflected light toward the light source is re-reflected by the reflection plate provided at the rear of the light source toward the reflective polarizing plate. If the light that did not pass through the reflective polarizing plate repeatedly travels between the reflective polarizing plate and the reflection plate as long as the polarization state of the light does not vary. In fact, the polarization state of the reflected light gradually varies during the repeated reflection. Thus, part of the reflected light passes through the reflective polarizing plate, and the unabsorbed light finally passes through the reflective polarizing plate. When the lighting system of the present invention is applied to a projector, the light that is first reflected by the reflective polarizing plate finally passes through the reflective polarizing plate toward a light modulation device if the polarization of the light is oriented to a predetermined direction. The lighting system of the present invention thus has a higher efficiency for light utilization than related art systems.

In the lighting system of the present invention, the reflective polarizing plate is used as an element having a polarization conversion function, in place of a related art PBS array. The reflective polarizing plate may be, for example, a multilayer polarizing film, which contributes to achievement of a compact, thin, and lightweight display, unlike the PBS array. The reflective polarizing plate can receive light on the entire surface, and does not require convergence of light to a specific position that is essential for the PBS array. Thus, the polarization conversion optical system needs no optical lens, resulting in a simplified structure. Furthermore, a wavelength plate, which is essential for the PBS array, is not required. Hence, the number of the component can be reduced.

The lighting system according to the present invention preferably further includes a retardation film between the light source and the reflective polarizing plate.

According to this structure, in addition to a spontaneous change in polarization when the light is reflected by the reflective polarizing plate or the reflection plate, in this structure, the retardation film actively changes the polarization state. Hence, the change in the polarization is enhanced when the light reciprocally travels between the reflective polarizing plate and the reflection plate. As a result, the light transmittance of the reflective polarizing plate increases so that the efficiency for light utilization can be enhanced. Preferably, the retardation film has various phase differences at positions transmitting the light, rather than a uniform phase difference such as a half-wave or quarter-wave phase difference. According to this structure, the light reciprocally traveling between the reflective plate and the reflective polarizing plate is subjected to different types of phase modulation in the forward path and the backward path, resulting in an enhanced change in the polarization state.

The lighting system preferably further includes a rod light guide or a tubular light guide between the light source and the reflective polarizing plate, the tubular light guide having a reflective inner face. Herein, "the rod light guide" or "the tubular light guide having a reflective inner face" indicates a related art rod lens.

According to this structure, the light guide (rod lens) not only introduces the light emerging from the light source to the reflective polarizing plate, but also reflects the light at the inner face of the light guide when the light passes therethrough. The light reflected at various angles is superimposed at the light emitting face of the light guide to uniform the illuminance of the light. That is, when the light is emitted from the illumination unit, the polarization state is oriented in one direction and the illumination distribution is uniform. In general, a projector is often provided with a uniform illumination device, for example, a fly-eye integrator or a rod integrator to uniform the illumination distribution of light from the light source. The illumination unit having the above structure functions as a uniform illumination device and a polarization conversion device.

The reflective polarizing plate may include a grid polarizer having a plurality of reflective elements arranged in a striped pattern at a pitch that is smaller than the wavelength of incident light.

In this structure, the reflective polarizing plate can be composed of an inorganic material, therefore having high light resistance and high heat resistance. Thus, this lighting system is particularly suitable for a projector that emits high-brightness light.

A projector according to a first aspect of the present invention includes the above-described lighting system. The lighting system is a planar lighting system including a plurality of the light sources that are arranged in a flat or curved plane and that emit color light beams of different colors in order of time. The projector further includes a light modulation device including a light valve that is driven in a time division mode in synchronization with emerging timings of the color light beams emerging from the light source in order of time, and a projecting device that projects the light modulated by the light modulation device.

In this structure, the lighting system of the present invention contributes to achievement of a compact, thin, and lightweight projector, and enhances the efficiency for light utilization, resulting in higher brightness and lower electric power consumption. Furthermore, this projector employs a driving mode referred to as a "color field sequential system." Thus, this projector requires only one light valve (single-plate structure), unlike related art three-plate projectors having three liquid crystal light valves for three color light beams. Accordingly, the projector requires only one illumination optical system for optical modulation device. Furthermore, the projector requires no color separation optical system and no color combining system, resulting in a significantly reduced number of the components, a simplified structure, and reduced cost.

A projector according to a second aspect of the present invention includes a plurality of the above-described lighting systems. Each of the lighting systems is a planar lighting system including a plurality of the light sources that are arranged in a flat plane and the lighting systems emit color light beams of different colors. The projector further includes a plurality of light modulation devices including light valves that modulate the color light beams emerging from the lighting systems via the polarization conversion device; a color combining device that combines the modulated color light beams from the plurality of light modulation devices; and a projecting device that projects the light combined by the color combining device.

Also, according to the projector of this structure, the lighting systems of the present invention contribute to achievement of a compact, thin, and lightweight projector, and enhance the efficiency for light utilization, resulting in higher brightness and lower electric power consumption. This projector requires a plurality of light valves, unlike the projector according to the first aspect. Since this projector emits different color light beams from the plurality of light sources and has the light valves for these color light beams, it does not require a color separation device, which is essential for any related art display. As a result, it has a simplified structure compared with the related art structure. Furthermore, synchronization of driving of the light sources with the light valves is not required, unlike the first aspect. Hence, the drive mechanism is simplified, and liquid crystal light valves having a lower response rate may be used.

DETAILED DESCRIPTION OF PREFERRED EMBODIMENTS

[First Exemplary Embodiment]

A first exemplary embodiment of the present invention is described below with reference to FIGS. 1 to 5.

Figure 1:
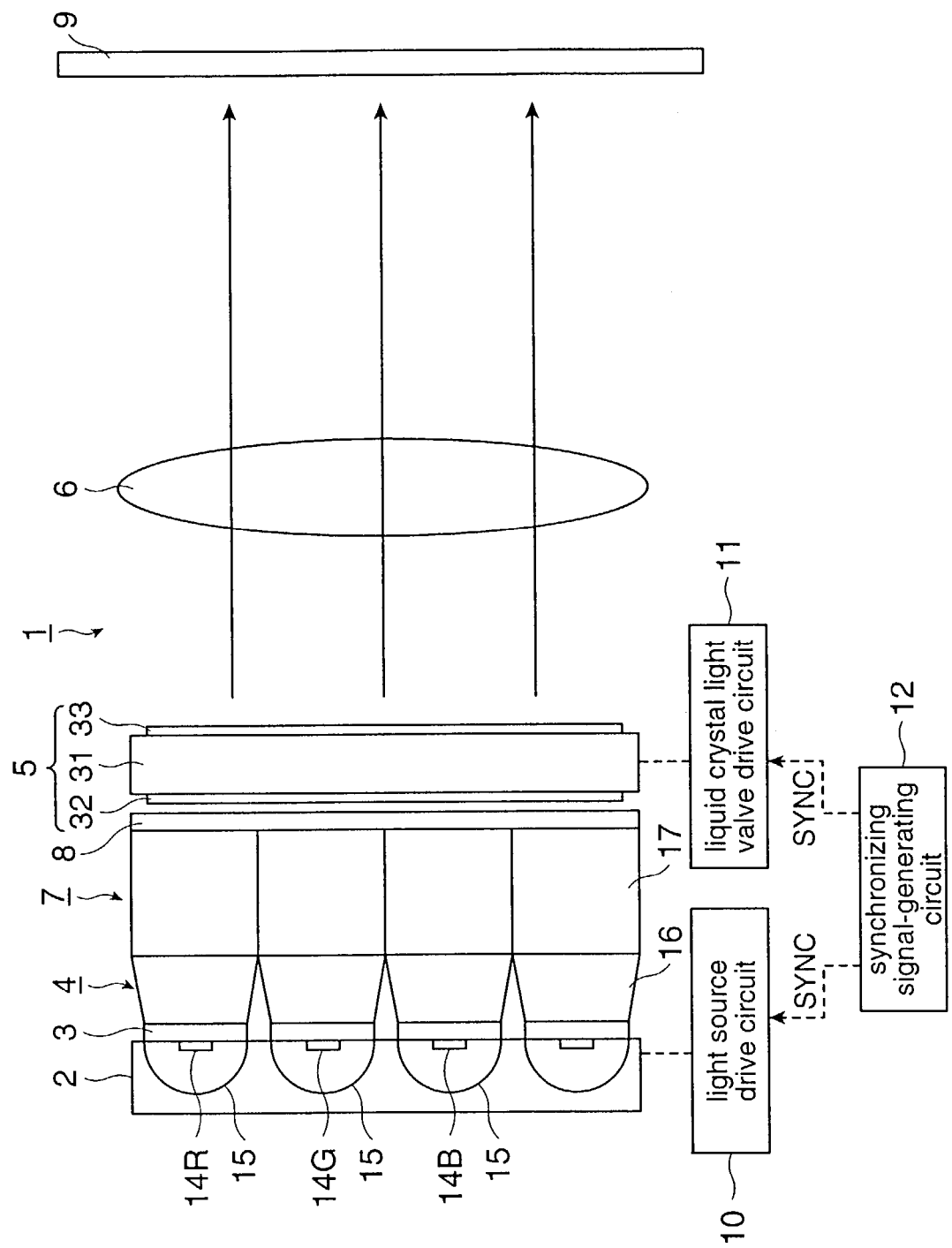
FIG. 1 is a schematic of a projector according to a first exemplary embodiment of the present invention.

This exemplary embodiment describes a liquid crystal projector of a color field sequential system. FIG. 1 is a schematic of an overall configuration of the projector 1 that includes an LED array (light source) 2, retardation films 3, a taper rod lens array 4, a rod lens array 7, a reflective polarizing plate 8, a liquid crystal light valve 5 as a light modulation device, and a projection lens 6.

Figure 2:
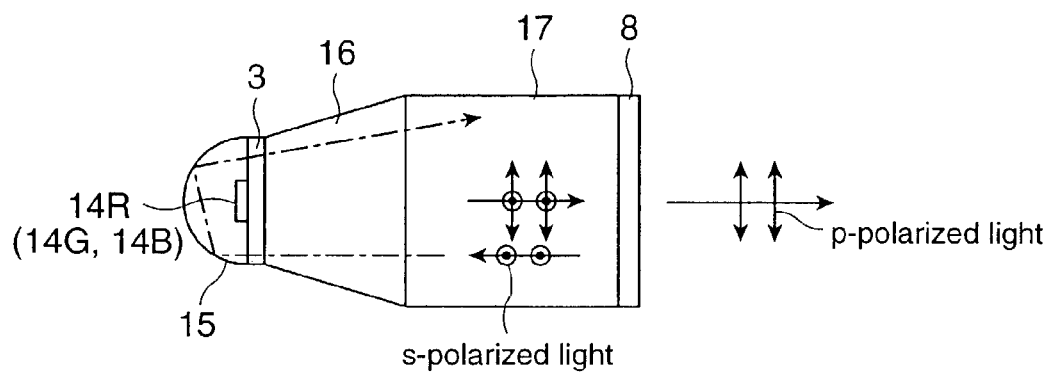
FIG. 2 is a cross-sectional view of one LED of a lighting system in the projector according to the first exemplary embodiment of the present invention.

As shown in FIG. 1, the projector 1 of this exemplary embodiment includes the LED array 2 that has a plurality of light-emitting diodes (LEDs) 14R, 14G, and 14B emitting R light, G light, and B light, respectively, (only four LEDs are depicted for simplicity in FIG. 1); the retardation films 3 provided at the light emitting side of the LED array 2; the taper rod lens array 4 and the rod lens array 7 that uniform illumination intensities of color light emerging from the LEDs 14R, 14G, and 14B; the reflective polarizing plate 8 that converts the polarization of the light from the rod lens array 7; the liquid crystal light valve 5 that modulates each color light from the reflective polarizing plate 8 to form an image; and the projection lens 6 that enlarges and projects the image formed by the liquid crystal light valve 5 onto a screen 9. A lighting system according to this exemplary embodiment is composed of the LED array 2, the retardation films 3, the taper rod lens array 4, the rod lens array 7, and the reflective polarizing plate 8. FIG. 2 shows only one LED of the lighting system of this exemplary embodiment.

The LED array 2 is connected to a light source drive circuit 10 that controls timing of the light emission of these LEDs 14R, 14G, and 14B so that the LEDs 14R, 14G, or 14B sequentially emit different colors in order of time, for example, R, G, B, R, G, B . . . In FIG. 2, the right faces of the LEDs 14R, 14G, and 14B are light emitting faces, the LEDs 14R, 14G, and 14B emitting light toward the right. At the rear side (the left in FIG. 2) of the LEDs 14R, 14G, and 14B relative to the light emitting direction, a curved reflective plate 15 of a metal film is disposed such that a reflective face is directed to the LEDs 14R, 14G, and 14B.

The taper rod lens array 4 includes a plurality of taper rod lenses 16 of wedge glass columns that are attached to the LEDs 14R, 14G, and 14B with retardation films 3 therebetween. In FIG. 2, the left face of each taper rod lens 16 is a light incident face and the right face is a light emitting face. Each taper rod lens 16 has a taper that diverges from the light incident face to the light emitting face. Similarly, the rod lens array 7 disposed at the light emitting face of the taper rod lens array 4 includes a plurality of rod lenses 17 of straight glass columns that correspond to the LEDs 14R, 14G, and 14B (taper rod lenses 16).

The retardation films 3 enhance conversion of the polarization state of the light that reciprocally travels between the reflective polarizing plate 8 and the reflective plate 15. The retardation films 3 impart a phase difference to the transmitted light to enhance the polarization state of the light in comparison with a case having no retardation film. Thus, these retardation films 3 are not limited to ones having a specific phase difference, for example, half-wave or quarter-wave retardation films. Preferably, the retardation films 3 have a nonuniform phase difference, that is, various phase differences at positions transmitting the light, rather than a uniform phase difference, such as a half-wave or quarter-wave phase difference. The light reciprocally traveling between the reflective plate 15 and the reflective polarizing plate 8 is subjected to different types of phase modulation in the forward path and the backward path, resulting in an enhanced change in the polarization state.

The reflective polarizing plate 8 transmits one of the p-polarized light and the s-polarized light (linearly polarized light) of the randomly polarized light emerging from the LED array 2 and reflects the other. Thus, the reflective polarizing plate 8 always emits light having the same polarization direction. The reflective polarizing plate 8 may be a multilayer polarization plate or a reflective polarizer being an inorganic grid polarizer.

Figure 5:
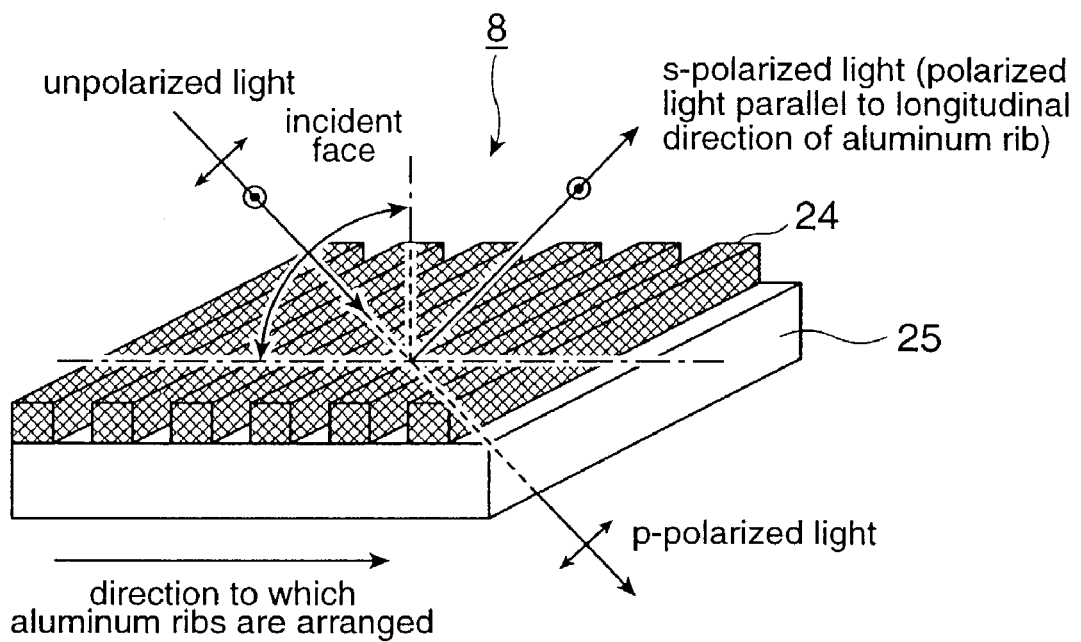
FIG. 5 is a perspective view of an exemplary embodiment of a reflective polarizing plate used in a lighting system.

As an example of the latter, FIG. 5 shows a grid polarizer, in which many metal ribs 24 (light reflectors) composed of aluminum or the like are formed on a glass substrate 25 at a pitch that is smaller than the wavelength of the incident light. Specifically, the reflective polarizer 8 includes aluminum ribs 24 and air layers that are alternately arranged in a striped pattern and have different diffractive indices at a pitch smaller than the wavelength of the incident light, so that the intensities of the transmitted light and the reflected light exhibit different behaviors depending on the polarization state. When randomly polarized light is incident on the surface provided with the aluminum ribs 24, the s-polarized light vibrating in a direction parallel to the aluminum ribs 24 is reflected while the p-polarized light vibrating in a direction perpendicular to the aluminum ribs 24 is transmitted.

In the lighting system of this exemplary embodiment, the light emerging from each of the LEDs 14R, 14G, and 14B has a luminance distribution with a high luminance in the center and a low luminance at the periphery of the LED. The taper rod lenses 16 and the rod lenses 17 are provided at the light emitting faces of the LEDs 14R, 14G, and 14B in this exemplary embodiment. The incident light from the LEDs 14R, 14G, and 14B are repeatedly reflected by the inner faces of these lenses 16 and 17 to uniform the illuminance of the light that is emitted from the light emitting faces of the rod lenses 17.

When the randomly polarized light having uniform illuminance is incident on the reflective polarizing plate 8, for example, the p-polarized light passes through the reflective polarizing plate 8, while the s-polarized light is reflected by the reflective polarizing plate 8 toward the LEDs 14R, 14G, and 14B. The light reflected toward the LEDs 14R, 14G, and 14B is re-reflected by the reflective plate 15 toward the reflective polarizing plate 8. The reflected light which did not pass the reflective polarizing plate 8 reciprocally travels between the reflective polarizing plate 8 and the reflective plate 15 as long as the polarization state does not vary. In fact, the polarization state of the reflected light gradually varies during the repeated reflection. According to this exemplary embodiment in addition to such a spontaneous change in the polarization state, the retardation films 3 provided in the optical paths between the reflective polarizing plate 8 and the reflective plate 15 actively change the polarization state of the light passing through the retardation films 3, enhancing the change in the polarization state. Thus, part of the light reflected by the reflective polarizing plate 8 and reciprocally traveling between the reflective polarizing plate 8 and the reflective plate 15 can pass through the reflective polarizing plate 8.

The liquid crystal light valve 5 includes a TN-mode active matrix transmissive liquid crystal cell 31 having thin film transistors (TFTs) functioning as pixel-switching elements. The liquid crystal cell 31 is provided with an incident polarizing plate 32 and an emitting polarizing plate 33 on the both faces, the transmission axes thereof being perpendicular to each other. For example, in an OFF state, the p-polarized light incident on the liquid crystal light valve 5 is converted into the s-polarized light and is emitted, whereas in an ON state, the light is blocked. The components of the lighting system, i.e., the LED array 2, the retardation films 3, the taper rod lens array 4, the rod lens array 7, the reflective polarizing plate 8, and the liquid crystal light valve 5 may be separately arranged. However, all the components are preferably in close contact with each other to achieve a compact and thin display.

Referring to FIG. 1, the liquid crystal light valve 5 is connected to a liquid crystal light valve drive circuit 11 that sequentially drives elements of the liquid crystal light valve 5 in order of time in the elements corresponding to the incident color light components. Furthermore, the projector 1 of this exemplary embodiment is provided with a synchronizing signal-generating circuit 12 that generates a synchronizing signal SYNC and inputs the signal SYNC to the light source drive circuit 10 and the liquid crystal light valve drive circuit 11 to synchronize the timing to emit color light from the LEDs 14R, 14G, and 14B with the timing for driving the respective elements of the liquid crystal light valve 5.

That is, in the projector 1 of this exemplary embodiment, one frame is time-shared so that R, G, and B light components are sequentially emitted from the LEDs 14R, 14G, and 14B in order of time. Furthermore, the timing for emitting the color light components from the LEDs 14R, 14G, and 14B is synchronized with the timing to drive the respective elements of the liquid crystal light valve 5 to drive the elements of the liquid crystal light valve 5 in order of time in response to the color light components emerging from the LEDs 14R, 14G, and 14B and to output image signals corresponding to the color light components from the LEDs 14R, 14G, and 14B. A color image is thereby formed.

The projector in this exemplary embodiment is driven by a driving mode called a "color field sequential system". Thus, this projector requires only one liquid crystal light valve (a single plate structure), unlike related art three-plate projectors having three R, G, and B liquid crystal light valves. Accordingly, the projector requires only one illumination optical system for an optical modulation device. Furthermore, the projector requires no color separation optical system and no color combining system, resulting in a significantly reduced number of the components, a simplified structure, and reduced cost.

In this exemplary embodiment, as described above, the lighting system is provided with the reflective polarizing plate 8 at the light emitting side and the reflective plate 15 at the rear side of the LEDs 14R, 14G, and 14B. The light originally reflected by the reflective polarizing plate 8 and repeatedly reflected between the reflective polarizing plate 8 and the reflective plate 15 is gradually polarized in one direction to passes through the reflective polarizing plate 8 toward the liquid crystal light valve 5. Accordingly, the lighting system has a higher efficiency for light utilization than the related art system.

The lighting system of this exemplary embodiment is provided with the reflective polarizing plate 8 instead of a related art PBS array as an element having a polarization conversion function. If a commercially available polarization film is used as the reflective polarizing plate 8, a more compact, thinner, and more lightweight display is achieved. If the reflective polarizing plate 8 includes a birefringent composite, it has superior properties, such as high light resistance and high heat resistance, particularly suitable for the projector. Since the reflective polarizing plate 8 can receive incident light over the entire surface, unlike the PBS array, it is not necessary to converge the light to a specific position. Thus, the polarization conversion optical system requires no lens, resulting in a simplified structure. Since a wavelength plate, which is essential for the PBS array, is not required, the number of the component can be reduced. Accordingly, the lighting system of this exemplary embodiment is very compact and has both a uniform illumination function and a polarized conversion function.

[Second Exemplary Embodiment]

Figure 6:
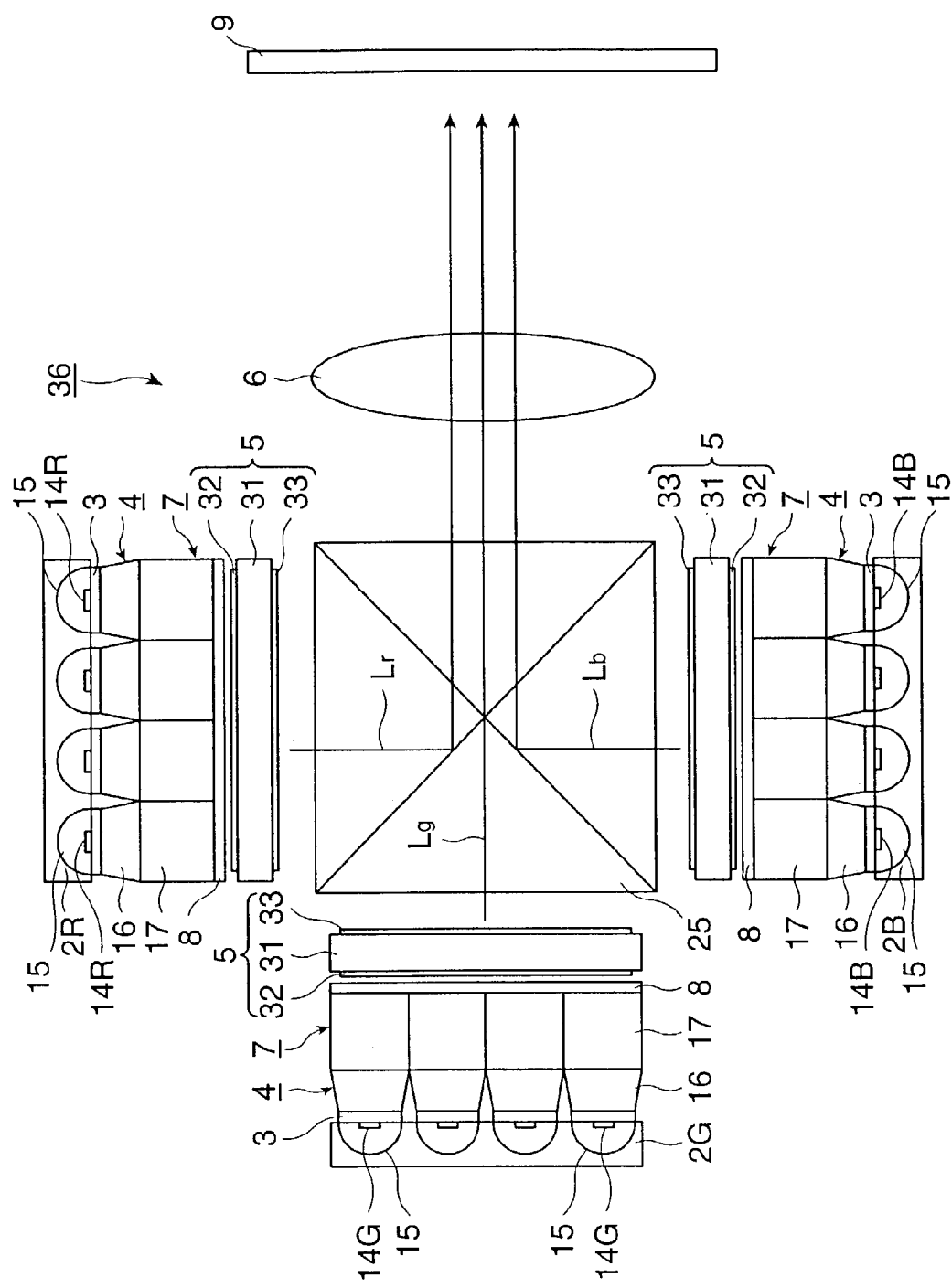
FIG. 6 is a schematic of a projector according to a second exemplary embodiment of the present invention.

A second exemplary embodiment of the present invention is described below with reference to FIG. 6.

This exemplary embodiment also shows a liquid crystal projector. While the first exemplary embodiment relates to a single-plate type of a color field sequential system, the second exemplary embodiment relates to a three-plates type. FIG. 6 is an enlarged schematic view of a projector. In FIG. 6, components having the same functions as in FIG. 1 are referred to with the same reference numerals, and a detailed description thereof has been omitted.

In the first exemplary embodiment, the LED array 2 having the LEDs 14R, 14G, and 14B that are arrayed in the same plane and emit R, G, and B different colors is used as a light source. In contrast, the liquid crystal projector 36 of this exemplary embodiment includes three planar light sources, i.e., an LED array 2R having LEDs 14R that are arranged in the same plane and emit red light, an LED array 2G having LEDs 14G that are arranged in the same plane and emit green light, and an LED array 2B having LEDs 14B that are arranged in the same plane and emit blue light. Retardation films 3, a taper rod lens array 4, a rod lens array 7, and a reflective polarizing plate 8 are arranged at the light-emitting face of each of the LED arrays 2R, 2G, and 2B, as in the first exemplary embodiment. Accordingly, the projector of the present invention has three lighting systems for red, green, and blue colors.

A liquid crystal light valve 5 to modulate the corresponding R, G, or B color is disposed at the light emitting face of the reflective polarizing plate 8 of each color. The three color light beams modulated in the liquid crystal valves 5 are incident on a cross-dichroic prism 25 as a color combining device. This prism 25 is composed of four rectangular prisms bonded to each other, a multilayer dielectric film reflecting red light intersecting a multilayer dielectric film reflecting blue light on the inner faces of these prisms. These multilayer dielectric films combine three color light beams Lr, Lg, and Lb to form a color image. The color image of the combined light is enlarged and projected on a screen 9 through a projection lens 6.

The projector of this exemplary embodiment requires three liquid crystal light valves 5, unlike the display of the first exemplary embodiment. In the projector of this exemplary embodiment, these liquid crystal light valves 5 are provided for three different color light beams emerging from the three lighting systems. Hence, this display does not require a color separation device, which is essential for any related art display. Accordingly, the display of this exemplary embodiment has a simplified structure compared with related art displays. In this exemplary embodiment, synchronization of driving of the LED arrays 2r, 2g, and 2b with driving of the respective liquid crystal light valves 5 is not required, unlike the first exemplary embodiment. Hence, the drive mechanism is simplified, and liquid crystal light valves having a lower response rate may be used.

Also in this exemplary embodiment, the reflective polarizing plate 8 is provided at the light emitting side of the lighting system and reflective plates 15 are provided at the rear of the LEDs 14R, 14G, and 14B. Thus, this display has the same advantages as those in the first exemplary embodiment, i.e., a high efficiency for light utilization, a simple structure of the polarization conversion optical system due to nonuse of a conversing lens, and a reduced number of components due to nonuse of a wavelength plate.

Figure 3:
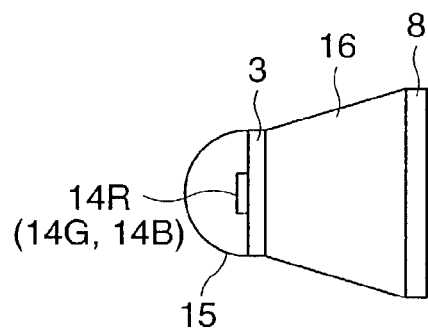
FIG. 3 is a cross-sectional view of another exemplary embodiment of the LED according to the present invention.
Figure 4:
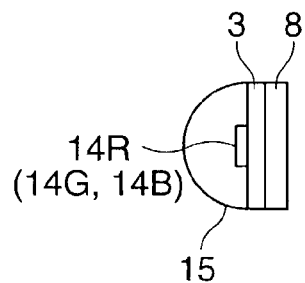
FIG. 4 is a cross-sectional view of another exemplary embodiment of the LED according to the present invention.

The technical scope of the present invention is not limited to the above exemplary embodiments, and may include various modifications within the scope of the spirit of the present invention. For example, in the above exemplary embodiments, as shown in FIG. 2, the retardation film 3, the taper rod lens 16, the rod lens 17, and the reflective polarizing plate 8 are sequentially disposed at the light emitting side of each of the LEDs 14R, 14G, and 14B. Alternatively, as shown in FIG. 3, the rod lens 17 may be omitted from the structure shown in FIG. 2. The thickness of the lighting system is thereby reduced. Furthermore, as shown in FIG. 4, the taper rod lens 16 may also be removed. The reflective polarizing plate 8 is directly attached to the retardation film 3 at the light emitting face of each of the LEDs 14R, 14G, and 14B. As a result, the thickness of the lighting system can be significantly reduced.

In the above exemplary embodiments, the number of the LEDs 14R, 14G, and 14B is equal to the number of the taper rod lenses 16 and the number of the rod lenses 17. Alternatively, one rod lens may be provided for a plurality of LEDs. Instead of the array of the LEDs 14R, 14G, and 14B, the light source may be one LED that can emit light with a sufficient intensity. Furthermore, the lighting system of the present invention may be applicable to a direct view display, in addition to the projector shown in the above exemplary embodiments.

[Advantages]

As described above, according to the present invention, the polarization state of the light that is reflected by the reflective polarizing plate is changed in one direction and will pass through the reflective polarizing plate toward the light modulation device, such as a light valve. Thus, the lighting system of the present invention has a higher efficiency for light utilization than that of related art displays. Furthermore, the reflective polarizing plate is used in place of a related art PBS array as a polarization conversion element, in the present invention. The reflective polarizing plate, which contributes to reductions in size, thickness, and weight of the display, is suitably used in a projector.

What is claimed is:

1. A lighting system, comprising:
    at least one light source; and
    a polarization conversion device that polarizes light from the light source in one polarization direction,
    the light source having at least one reflection plate that reflects light toward a light emitting side,
    the polarization conversion device being provided at the light emitting side of the light source, the polarization conversion device having a reflective polarizing plate that transmits polarized light having a predetermined vibration direction and reflects polarized light having vibration directions other than the predetermined vibration direction,
    at least one of a rod or a tubular light guide provided between the light source and the reflective polarizing plate, the tubular light guide, when provided, having a reflective inner face, and
    the light source, the at least one of the rod or the tubular light guide, and the polarization conversion device being attached to each other.

2. A projector, comprising:
    the lighting system according to claim 1;
    a light modulation device that modulates a light beam emerging from the lighting system; and
    a projecting device that projects the light modulated by the light modulation device.

3. The lighting system according to claim 1, the at least one light source being at least one LED array.

4. The lighting system according to claim 1, further comprising a retardation film provided between the light source and the reflecting polarizing plate.

* * * * *